United States Patent [19]

Biondo, Jr.

[11] Patent Number: 4,891,660
[45] Date of Patent: Jan. 2, 1990

[54] AUTOMATIC PHOTOGRAPHIC SYSTEM AND FRAME DISPENSER

[75] Inventor: John V. Biondo, Jr., Los Angeles, Calif.

[73] Assignee: PVI, Inc., San Diego, Calif.

[21] Appl. No.: 277,297

[22] Filed: Nov. 29, 1988

[51] Int. Cl.$^4$ ............................................. O03B 7/00
[52] U.S. Cl. .................................. 354/412; 354/467; 354/76; 354/220; 354/290; 354/83
[58] Field of Search .............. 354/412, 467, 76, 220, 354/290, 83

[56] References Cited

U.S. PATENT DOCUMENTS

| | | | |
|---|---|---|---|
| 1,879,949 | 9/1932 | Pinkosh | 354/220 |
| 1,992,068 | 2/1935 | Gwozdecki | 354/220 |
| 2,515,350 | 7/1950 | Lissiansky | 354/83 |
| 2,796,812 | 6/1957 | Koci . | |
| 2,832,275 | 4/1958 | Applegate . | |
| 3,631,781 | 1/1972 | Kennington . | |
| 3,820,133 | 6/1974 | Adorney . | |
| 3,821,760 | 6/1974 | Kennedy . | |
| 3,864,708 | 2/1975 | Allen . | |
| 4,072,973 | 2/1978 | Mayo . | |
| 4,089,017 | 5/1978 | Buldini . | |
| 4,091,397 | 5/1978 | Gulbrandsen . | |
| 4,738,526 | 4/1988 | Larish . | |
| 4,771,300 | 9/1988 | Bryan | 354/220 |

FOREIGN PATENT DOCUMENTS 0010230 4/1972 Japan .................................. 354/220

Primary Examiner—Russell E. Adams
Attorney, Agent, or Firm—Sigalos, Levine & Montgomery

[57] ABSTRACT

An automatic photographic system including a housing, a camera having self developing film mounted within the housing, and electrical circuits within the housing providing visual and/or audible customer use instructions, and wherein the housing is adapted for mounting on a single stand-alone support which includes provision for displaying available accessory items such as photographic holders or frames.

28 Claims, 4 Drawing Sheets

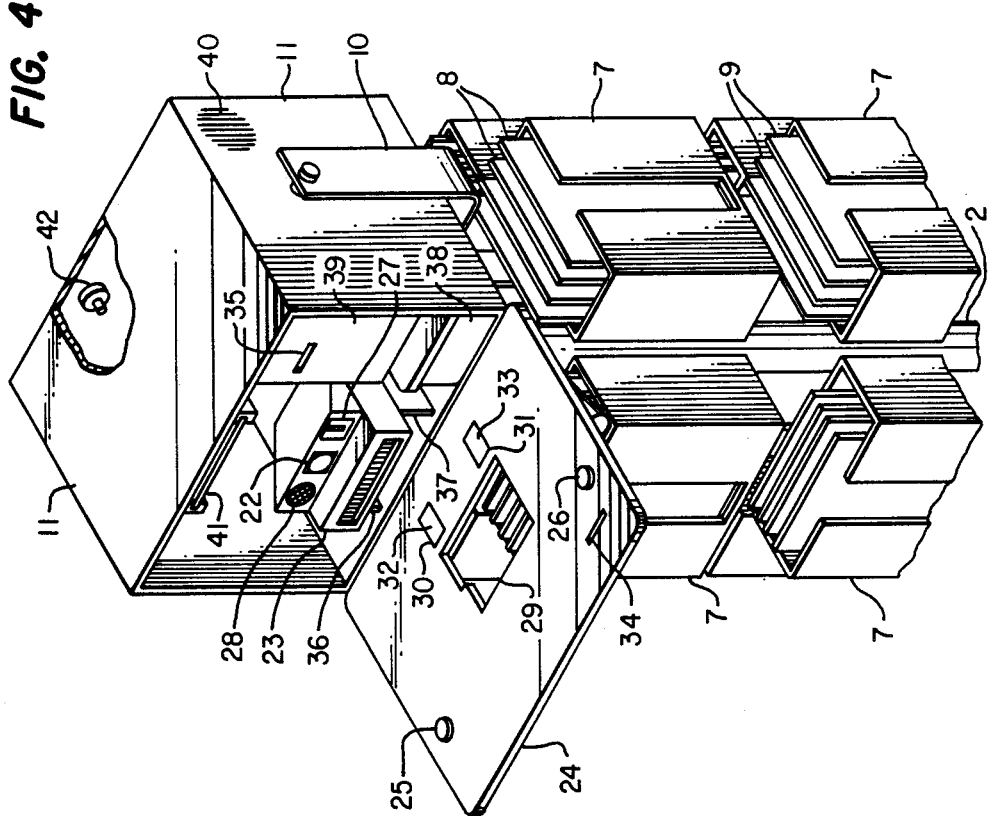
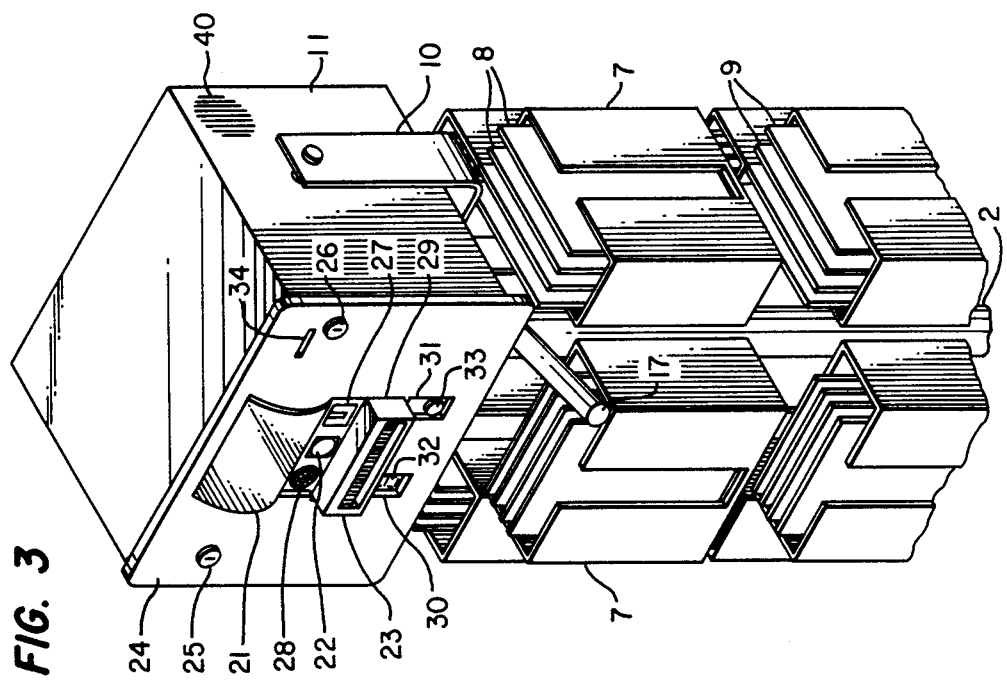

AUTOMATIC PHOTOGRAPHIC SYSTEM AND FRAME DISPENSER

BACKGROUND OF THE INVENTION

1. FIELD OF THE INVENTION

This invention relates to photography systems, and more particularly to such systems adapted for activation and use by the general public. It further contemplates deployment of such systems in locations generally accessible by the public, such as stores, specialty shops and the like where members of the public may activate the equipment to obtain single or group photos without the necessity, ordinarily, for intervention by or involvement of other personnel.

2. DESCRIPTION OF THE PRIOR ART

Automatic photography equipment has heretofore been proposed, illustrative of which are the systems described in U.S. Pat. Nos. 3,820,133, granted to Charles S. Adorney on June 25, 1974; 3,864,708, granted to Brian Allen on Feb. 4, 1975; 4,072,973, granted to William Mayo on Feb. 7, 1978; 4,089,017, granted to Daniel Buldini on May 9, 1978; and 4,738,526, granted to John Larish on Apr. 19, 1988.

The foregoing patents describe various configurations for providing automatic/semi-automatic photography for general use by the public and include various features for assisting the subject to assume a desired position with respect to the photography apparatus, utilization of self-developing equipment such as that produced by the Polaroid Corporation, adjustment of flash intensity and coin actuation. However, although various of the foregoing proposals find expression in various of the above-identified patents, there has remained the need for a system embodying all of the foregoing features and which further includes the utilization of synthesized voice instructions together with improved payment sensing, simplified positioning and camera out-of-film indication.

SUMMARY OF THE INVENTION

The photographic system according to the present invention embodies all of the foregoing features in one coordinated automatic simplified system which is compact and adapted for stand-alone mounting atop a small vertically disposed post or the like, thereby eliminating the necessity for enclosures such as booths and rendering the system attractive for coordinated disposition with auxiliary or accessory items such as picture frames, mounting cards and the like.

OBJECTS AND FEATURES

It is one general object of this invention to improve self-operated photographic systems.

It is another object of the invention to reduce the size of such systems.

It is another object of the invention to reduce the need of dedicated space for surrounding the person or persons to be photographed.

It is another object of the invention to encourage use of the photographic equipment through the advantageous use of accessory supporting means.

It is yet another object of the invention to increase utilization of the equipment by audible solicitation.

Accordingly, in accordance with one feature of the invention, a compact housing is employed to house a self-developing film-type camera, together with associated control circuitry and audible announcing and instruction-providing means, thereby reducing space requirements and rendering the photographic system adaptable for mounting on a single vertical support.

In accordance with still another feature of the invention, a simple convex mirror is positioned in close proximity to the camera and is supported by the aforementioned housing, thereby simplifying positioning of subjects with respect to the camera and reducing cost and complexity. In accordance with still another feature of the invention, simple mechanical swivels are employed to provide both horizontal panning and vertical adjustment of the housing and camera, thereby increasing flexibility of use while maintaining simplicity and low cost. In accordance with still another feature of the invention, electronic circuitry is provided within the aforementioned housing to provide explicit voice instructions to the equipment user and, if desired, to include numerous comments to evoke smiles or other photographic enhancing qualities in the subject to be photographed, thereby improving performance of the system.

In accordance with still another feature of the invention, audible messages are periodically announced, thereby facilitating awareness of the existence of the equipment and increasing customer use.

In accordance with still another feature of the invention, a proximity detector is employed to sense the presence of a potential customer and to address the customer orally.

In accordance with still another feature of the invention, in an alternative embodiment, the aforementioned voice instructions may include details regarding the availability and purchase of accessory items, such as the aforementioned photographic holders or frames, thereby enhancing customer attractiveness and increasing sales.

These and other objects and features of the invention will be apparent from the following detailed description, by way of description of a preferred embodiment, in accordance with the drawing in which the several figures employ like reference numerals to designate like parts.

THE DRAWING

FIG. 3 is a front perspective view illustrating the camera housing mounted on a supporting post;

FIG. 4 is a perspective view similar to that of FIG. 3 but with the front face of the housing lowered to expose the major components mounted within the housing;

DESCRIPTION OF THE PREFERRED EMBODIMENT

Figure 1:
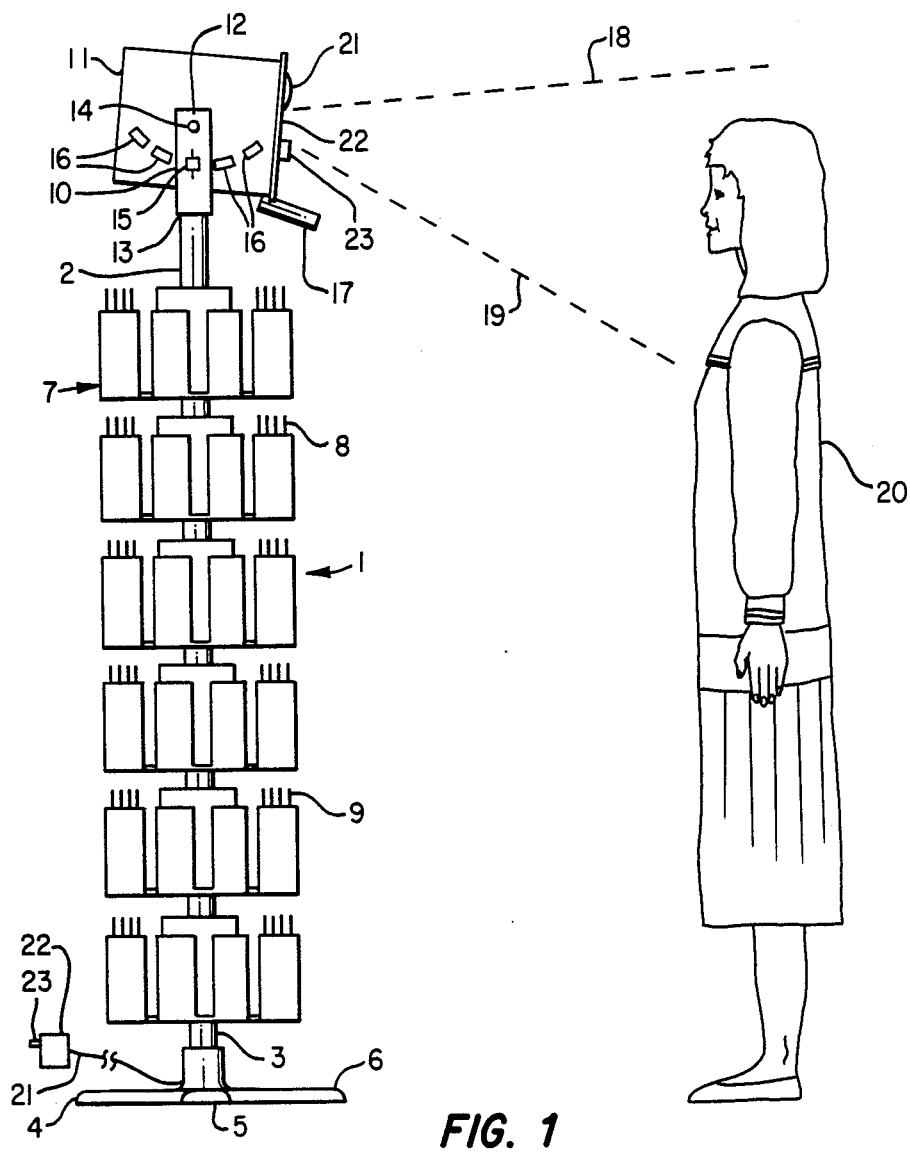
FIG. 1 is a side elevational view of the system according to the invention, in which there is illustrated the camera housing and its contents mounted atop a display support and including a representation of a typical photographic subject.

Referring now to the drawing, it will be observed that there is illustrated a preferred form of the automatic photographic system hereof which features token operated automatic photographic apparatus and photomount accessory rack. The combination apparatus and accessory rack is generally designated by the numeral 1 which is observed to comprise supporting post 2 attached at its lower end 3 to conventional supporting feet 4, 5 and 6.

Mounted on supporting post 2 are a plurality of conventional card rack holders 7 adapted for holding accessories such as photomount cards 8 and, optionally, photograph mounting frames 9.

Mounted atop supporting post 2 is U-shaped cradle 10 adapted for supporting housing 11 in which are mounted system components as described below.

Vertical and horizontal adjustment of housing 11 (and its contents, including the camera) is provided by a pair of swivels generally designated by the symbols 12 and 13. Swivel 12 comprises a pair of projections 14 and 14a (FIG. 2) which mate with corresponding apertures in U-shaped cradle 10; and provision is made for maintaining a desired vertical adjustment by detent rollers 15 and 15a which mate with corresponding detents 16 and 16a.

Swivel 13 may comprise any of a plurality of known horizontal type swivels which permit relative rotational movement of U-shaped cradle 10 with respect to supporting post 2. If desired, conventional clamping means may be included to permit manual clamping of swivel 13 or, alternatively, the construction may include a frictional engagement of the parts so as to provide positional stability once the U-shaped cradle has been swung (panned) to the desired position.

Further reference to FIG. 1 reveals the inclusion of a projecting handle extension 17 which is affixed to housing 11 and which provides for manual adjustment both vertically and horizontally of housing 11. Although shown as projecting only slightly forward from the face of housing 11, additional extensions such as telescoping sections may be optionally provided to permit adjustment from a position such as that shown for customer 20. When extended, such telescoping sections will lie beneath the field of view designated by lines 18 and 19 and, consequently, will not be seen in the photograph.

Also shown in FIG. 1 is electrical connecting cord 21 and conventional voltage reduction transformer 22 which is adapted for plugging into a conventional wall socket (not shown) by projecting prongs 23.

Projecting toward the customer 20 (i.e., toward the photographic subject 20) is simple convex mirror 21 which provides the customer with a reference to use in positioning housing 11 by manual manipulation of projecting handle 17. As shown in the figures, mirror 21 is closely positioned to the lens area 22 of camera 23, thereby minimizing undesired parallax.

Figure 2:
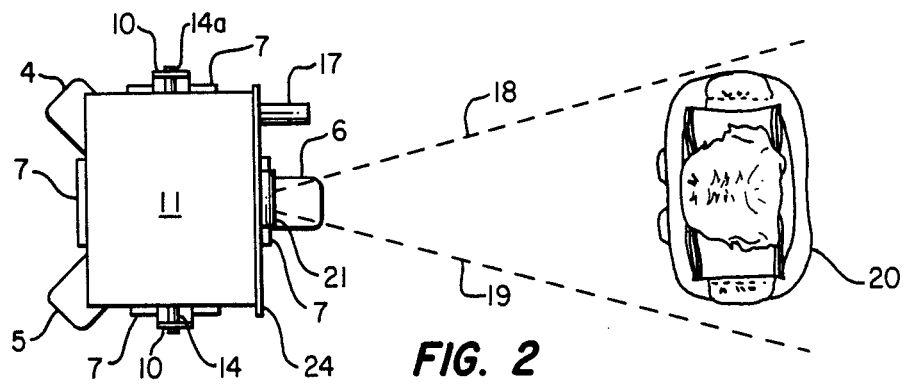
FIG. 2 is a top plan view of the photographic equipment and subject of FIG. 1.

Now turning to FIG. 2, the apparatus of FIG. 1 is shown in top plan view. However, not all the details are illustrated therein. Thus, for example, detent roller 15a and detent 16a which are on the reverse side of the housing 11 as depicted in FIG. 1, are not shown in FIG. 2.

Now turning to FIG. 3, it will be seen that the equipment is shown in front perspective with housing 11 being swivelably attached to U-shaped cradle 10 as described above. Attached to housing 11 by hinges (not shown) is front face plate 24 which is fitted with a plurality of apertures as more particularly shown in FIG. 4. Preferably mounted on the exterior surface of front face plate 24 is convex mirror 21, which, as described above, is provided for the purpose of permitting the subject to be photographed to adjust the camera field of view as desired. However, it will be evident that an aperture could be provided in front face plate 24 in the location shown for convex mirror 21, and in such event, the convex mirror could be mounted immediately behind the aperture and continue to serve in its above-described capacity. Such an optional positioning might be desirable in situations where it was desired to position a protective transparent layer in front of the mirror to protect it from vandalism or breakage.

Also mounted on front face plate 24 are one or more locks provided to prevent unauthorized access to the interior of housing 11. While one lock properly positioned could be adequate, in accordance with the preferred embodiment, a pair of such locks 25 and 26 are provided. These locks are conventional in nature and are accessed from the exterior of the equipment by apertures in which the locks are mounted. As shown in FIG. 3, these locks are of a keyed type. However, they could alternatively be of a combination type. As mentioned above, apertures are provided in front face plate 24 so as to provide exposure by the camera 23 (mounted within housing 11) to the exterior. Thus, as will be observed from further inspection of FIG. 3, the lens area 22, the main body of the camera 23, and the associated flash and focusing areas 27 and 28 are exposed through the front face plate aperture 29.

Also exposed through apertures 30 and 31 are visual display unit 32 and start push button 33. Also included within front face plate 24 is coin slot 34, which is provided for use by the customer in depositing either the required amount of money in coins or to deposit a predetermined type of token which could be purchased by the customer.

Figure 5:
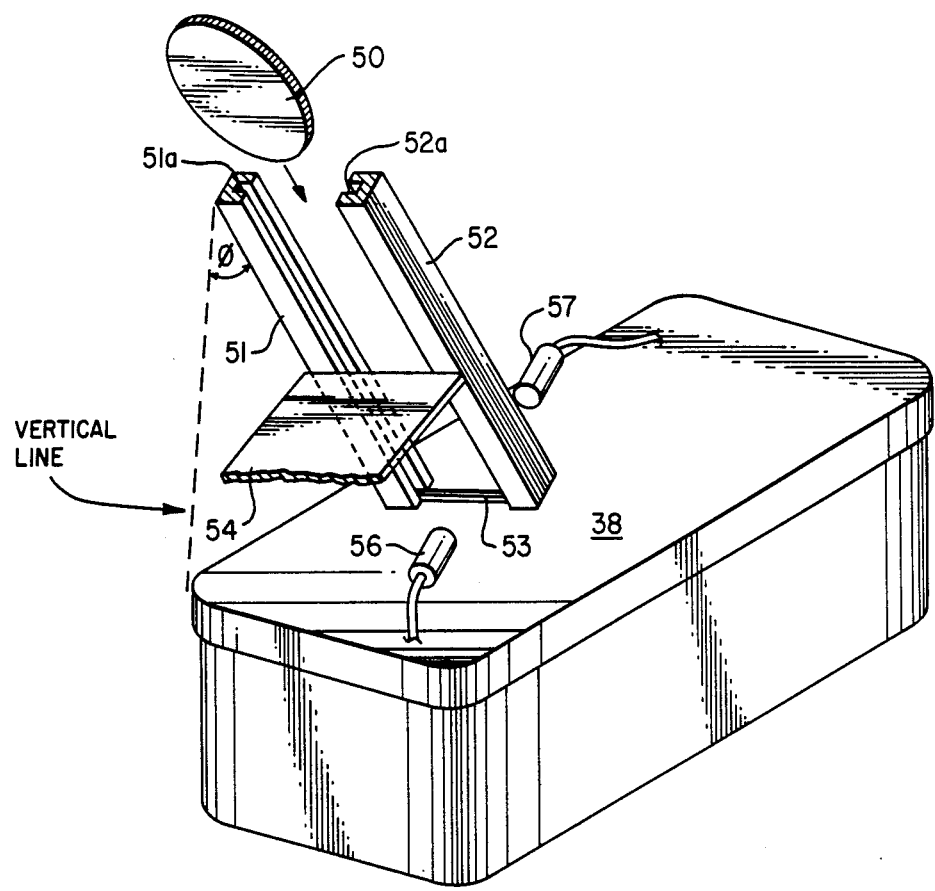
FIG. 5 is an enlarged perspective view of a preferred form of coin/token sensor used in the system.

Now turning to FIG. 4, the equipment of FIG. 3 is seen to be shown with the front face plate 24 in the hinged down or open position, thus exposing components that are mounted therewithin. Camera 23 is seen to be supported by a pair of vertically disposed supports and may be attached thereto by any of a number of conventional quick release type attachments. Also shown within enclosure 11 is coin collection tray 38 positioned beneath coin sensor housing 39. As will be observed from the description of FIG. 5, coin sensor housing 39 encloses and supports a coin/token sensing mechanism which detects bogus coins and prevents actuation of the equipment thereby. Also contained within enclosure 11 is a loud speaker 90 (FIG. 6) which is fastened to the interior of the enclosure immediately adjacent loud speaker grill 40 in order to provide for acoustical transmission of instructions and/or entertainment to the equipment user.

Figure 6:
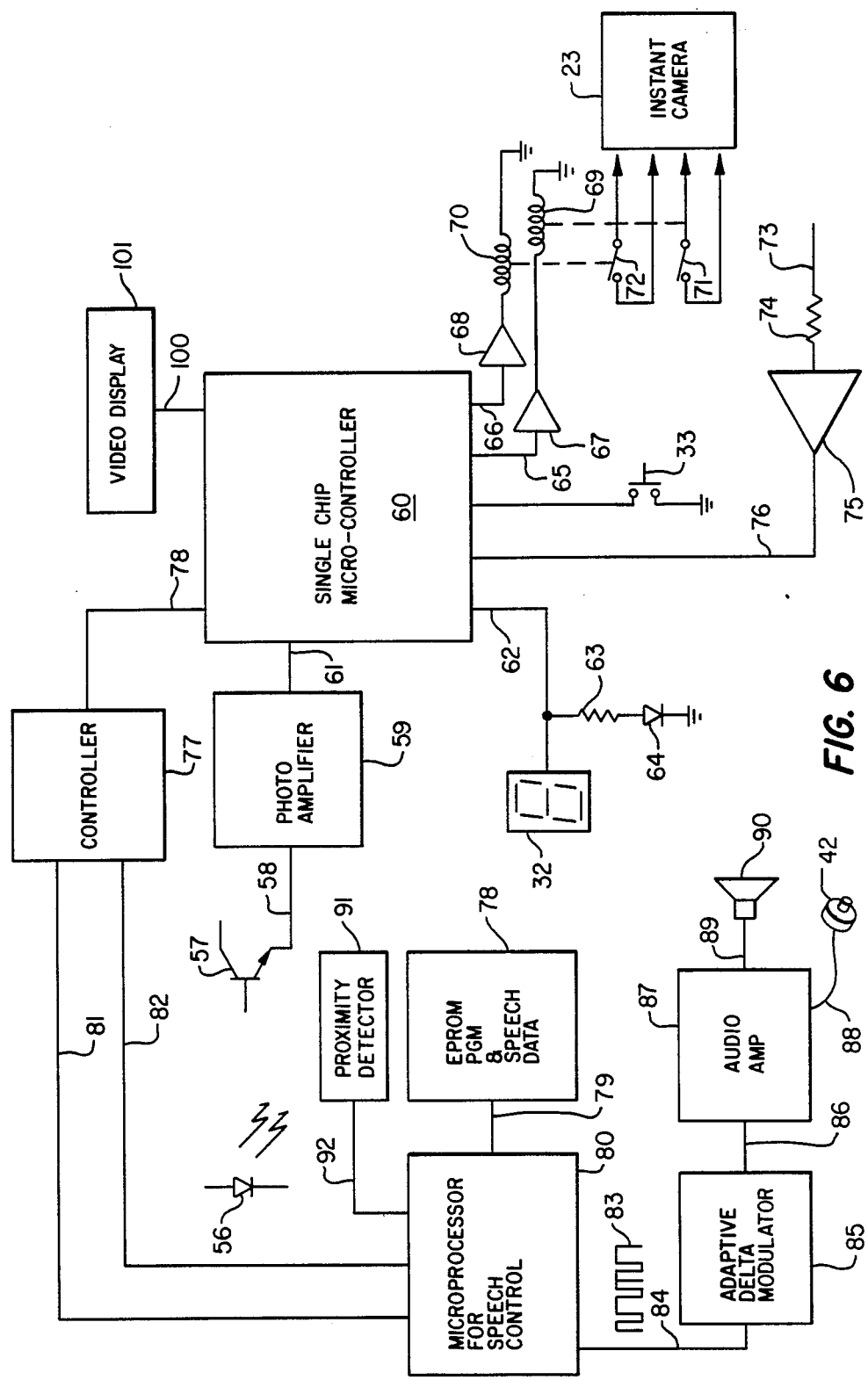
FIG. 6 is an electrical block diagram depicting the preferred embodiment and illustrating a micro-computer implementation of the camera controller, visual display, token sensor, speech instruction control and related circuitry.

Located at any other suitable position within enclosure 11, but preferably in a position readily accessible from the front, is an electronic circuit board 41 on which there are mounted electronic components as described with respect to FIG. 6. Also positioned in a readily accessible location is volume control element 42 which can be varied to adjust the volume of sound produced through loud speaker grill 40. Now turning to FIG. 5, the preferred form of coin/token sensing equipment is depicted. There it will be observed is shown a coin or token 50 which is of a denomination or size for which the equipment is adapted. As will be evident from an inspection of the figure, the two juxtaposed inclined guides 51 and 52 include coin/token accepting slots 51a and 52a, the upper ends of which are in communication with coin slot 35 (FIG. 4). At the lower extremity of guides 51 and 52 is a coin/token drop slot through which coins/tokens fall into collection tray 38; or, alternatively, if it is desired to eliminate the upper surface or lid on coin collection tray 38, to drop directly thereinto without the necessity for the slot.

Also provided in the coin/token sensing mechanism is inclined guide 54 onto which undersized coins drop and are returned through a port (not shown) to the customer.

In operation, the coin sensing mechanism will, of course, reject oversize coins since they will not fit within slots 51a and 52a. Correspondingly, undersized coins will fall in a vertical line and consequently will not follow the inclination of guides 51 and 52. Accordingly, they will fall onto inclined coin return guide 54 and be returned to the customer. Coins that are the correct size, however, will fall under the influence of guides 51 and 52 and pass between light emitting diode 56 and photo detector 57. In passing between the emitter 56 and detector 57, the coin or token interrupts the light path therebetween and causes photo detector 57 to change from a light receiving to a "no light" condition, thereby activating circuits in accordance with the description hereinafter set forth in respect of FIG. 6.

Now turning to FIG. 6, the electronic circuits in accordance with the invention are set forth. The aforementioned light emitting diode 56 is connected to a conventional source of current, as is photo detector transistor 57. The output of photo detector transistor 57 is connected via conductor 58 to photo detector amplifier 59, the output of which is communicated to single chip microcontroller 60 via path 61.

Also connected to single chip microcontroller 60 is conventional start/stop button 33 which is effective to complete a connection to ground and thus signal microcontroller 60 that a customer desires to use the equipment. Additional inputs and outputs are seen to be connected to microcontroller 60. Thus, path 62 is seen to connect microcontroller 60 and conventional visual display device 32, with a conventional resistor 63 through light emitting diode 64. Still other connections to microcontroller 60 include paths 65 and 66 which are serially connected through conventional amplifiers 67 and 68 to starting relay coils 69 and 70 to close contacts 71 and 72 thereby to activate the camera 23.

Advantage is taken of the empty film signal produced by the camera to provide a visual display and, optionally, to sound an audible signal. Thus, empty camera signal is conducted from the camera via conductor 73, serially connected resistor 74, high impedance decoupling amplifier 75 and conductor 76 to single chip microcontroller 60.

Also included in the circuitry and connected between microcontroller 60 and speech control microprocessor 80 by conducting paths 78, 81 and 82, is handshake controller 77. As will be apparent to those skilled in the art, handshake controller 77 comprises interface circuits that provide effective communication between microcontroller 60 and speech control microprocessor 80.

In order to provide speech programming and speech data, EPROM program and speech data circuits are provided. As is well-known in the art, the EPROM (erasable programmable read only memory) circuits provide in programmable hardware form the program and speech data needed to individualize the installation as desired. The output of circuits 78 is conducted via path 79 to speech control microprocessor 80 which is responsive to signals conducted from handshake controller 77 via paths 81 and 82 to produce digital signals 83 which are conducted via path 84 to adaptive delta modulator 85 where they are effective to produce conventional audio frequency signals which are communicated via conductor 86 to conventional audio amplifier 87. Audio volume control 42 is connected via conductor 88 to audio amplifier 87 so as to control the audio output level therefrom. This audio output is communicated via conducting path 89 to loudspeaker 90.

A conventional proximity detector 91 is provided to detect the near presence of a non-stationary object such as a potential customer. Upon sensing the presence of such, detector 91 produces a corresponding signal which is conducted to speech control microprocessor 80 via path 92, thus activating microprocessor 80 to produce signals which, when translated by adaptive delta modulator 85, cause audio amplifier to produce speech signals inviting the potential customer to use the equipment.

In accordance with normal operation of the circuits, the single chip microcontroller 60 periodically extends commands via conducting path 78, handshake controller 77, and conducting paths 81 and 82 to speech control microprocessor 80 thereby to activate speech controller 80 to produce signals representing an announcement to alert those within ear-shot of the existence and features of the equipment.

When a customer desires to utilize the machine, he or she deposits the required coins or tokens in slot 34 thus causing detection thereof by photo responsive transistor 57 and the ensuing activation of photo amplifier 59. Accordingly, microcontroller 60 is activated and awaits depression of start switch 33 to initiate the vend sequence. Alternatively, if start switch 33 is depressed prior to the deposit of required coins or tokens, then depression of switch 33 is effective to cause microcontroller 60 to issue instructions to microprocessor 80 to produce one or more verbal instructions to the customer instructing him to make the required deposit.

After the correct deposit has been made and the start switch 33 has been depressed, microcontroller 60 initiates the vend sequence by producing verbal prompting to pose. When the customer is ready, the start switch may be depressed again to activate the camera itself and to take the picture. This, of course, is accomplished through relays 69 and 70 as described above.

If the camera becomes empty of film, the electrical signal described above is effective to cause microprocessor 60 to provide a visual indication thereof through visual display 32 and, optionally, to make a characteristic sound through loudspeaker 90, thereby alerting store personnel of the necessity to reload the camera.

As mentioned above, the equipment readily lends itself to visual as well as audible communication with the customer to communicate humor or other entertainment to evoke smiles or other pleasing facial expressions which then may be captured by the camera. Such humor may be programmed into the EPROM program and speech data module 78 in addition to the speech indicia described above. Moreover, the circuits are readily usable with auxiliary or with audio-visuals such as video recorders and television-type monitors should it be desired to provide animated visual displays. Such optional additional displays are represented by optional connecting path 100, which interconnects single chip microcontroller 60 with optional video display equipment 101.

It will now be evident that there has been described herein an improved automatic photographic system having substantially improved features. Although the inventive concepts hereof have been illustrated by way of a preferred embodiment, it will be evident to those skilled in the art that other adaptations and modifications may be employed without departing from the spirit and scope of the invention. Thus, for example, the convex mirror hereof could be replaced by a video monitor if desired, although such video monitor would add to the cost and complexity of the apparatus.

The terms and expressions used herein are employed as terms of description and not of limitation; and consequently, there is no intent in the use thereof of excluding any and all equivalents but on the contrary it is intended to include all adaptations and modifications that may be employed without departing from the spirit and scope of the invention as defined in the claims. Moreover, it should be noted that the terms "tokens" and "coins" are employed to designate objects used to make payment. Thus, such terms are interchangeable herein unless the context requires otherwise.

What is claimed is:

1. A photographic system comprising a camera; a camera housing; means for mounting said camera within said camera housing; positioning means for customer viewing whereby said customer may position himself within the desired camera field of view; a stand-alone support for said housing means; means for mounting said housing on said support; electrical to acoustical transducer means; electrical control circuits mounted within said housing, said circuits including payment verification means, and means for generating electrical signals representing: instructions for use of said camera, announcements of predetermined content, and customer entertainment; and means for connecting said electronic circuits with said transducer means whereby upon receipt of said electrical signals, said transducer means responds to produce audible transductions thereof.

2. A photographic system according to claim 1 in which said camera housing includes a front face and in which said positioning means includes a mirror and is mounted on the exterior of said front face.

3. A photographic system according to claim 1 in which said camera housing includes a front face with an aperture therein and wherein said positioning means includes a mirror and is mounted within said camera housing behind said aperture.

4. A photographic system according to claim 1 in which said stand-alone support includes racks adapted for holding photomount cards and the like.

5. A photographic system according to claim 1 in which said stand-alone support is a single vertical member.

6. A photographic system according to claim 5 in which said single vertical member includes a plurality of racks attached thereto, said racks being adapted for holding photomount cards and the like.

7. A photographic system according to claim 1 further including swivel means for mounting said housing on said stand-alone support.

8. A photographic system according to claim 1 further including swivel means for mounting said housing atop said stand-alone support.

9. A photographic system according to claim 7 in which said swivel means includes a first swivel adapted for providing horizontal angular movement of said housing on said support, thereby to permit panning of the camera.

10. A photographic system according to claim 7 in which said swivel means includes a second swivel adapted for providing vertical angular movement of said housing on said support, thereby to provide vertical adjustment of the field of view of said camera.

11. A photographic system according to claim 7 in which said swivel means includes a first swivel adapted for providing horizontal angular movement of said housing on said support and a second swivel adapted for providing vertical angular movement of said housing, thereby to provide horizontal and vertical adjustment of the field of view of said camera.

12. A photographic system according to claim 1 in which said camera includes means for self developing its film.

13. A photographic system according to claim 1 in which said electrical control circuits further include provision for detecting camera out-of-film condition and for producing an alarm in response thereto.

14. A photographic system according to claim 13 in which said alarm is visual.

15. A photographic system according to claim 13 in which said alarm is audible.

16. A photographic system according to claim 1 in which said alarm is both audible and visual.

17. A photographic system according to claim 1 wherein payment verification means are located within said housing.

18. A photographic system according to claim 17 in which said payment verification means includes payment repository means and a chute having a pair of inclined slotted rails adapted for conveying coins and the like from point of entry into said photographic system to said payment repository.

19. A photographic system according to claim 18 in which said payment repository is a box.

20. A photographic system according to claim 18 wherein said payment verification means includes radiant energy interruption sensing for sensing the introduction of a valid payment to said system.

21. A photographic system according to claim 1 in which said camera housing includes a front-latched hinged door.

22. A photographic system according to claim 1 further including proximity detector means for detecting the proximity of one or more persons, and wherein said electrical control circuits further include means responsive to the detected presence of one or more persons to produce a recorded announcement orally inviting such persons to utilize the equipment.

23. A photographic system according to claim 1 wherein said electrical control circuits include an erasable programmable memory adapted for storing electrical indicia representing speech instructions and messages.

24. A photographic system according to claim 1 wherein said electrical control circuits include a single-chip microprocessor adapted for controlling the operation of said camera.

25. A photographic system according to claim 23 in which said electrical control circuits include a speech control microprocessor and in which said speech control microprocessor is connected to said erasable programmable memory and accesses said erasable programmable memory to obtain speech information for processing.

26. A photographic system according to claim 24 in which said electrical control circuits further include a speech control microprocessor.

27. A photographic system according to claim 24 in which said electrical circuits further include an erasable programmable memory adapted for storing electrical indicia representing speech instructions and messages.

28. A photographic system according to claim 24 in which said electrical control circuits include a speech control microprocesser and an erasable programmable memory, and in which said speech control microprocessor is connected to said erasable programmable memory and accesses said erasable programmable memory to obtain information for processing.

* * * * *